Figure 1:
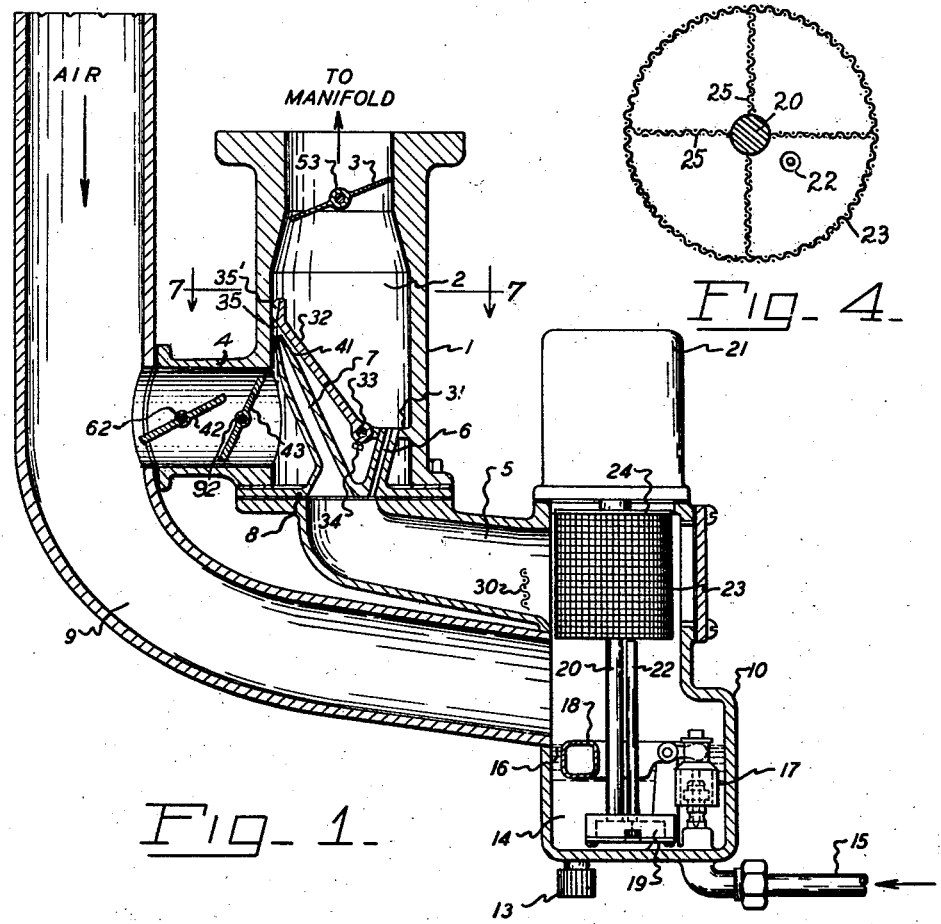

Inventor
HEBER R. MASON
By Beaman + Langford
Attorney

Patented Dec. 26, 1944

2,365,968

UNITED STATES PATENT OFFICE 2,365,968

CARBURETOR

Heber R. Mason, Washington, D. C., assignor of one fourth to Paul Henderson, Washington, D. C.

Application November 17, 1941, Serial No. 419,380

14 Claims. (Cl. 261—47)

The present invention relates to carburetors and more particularly to carburetors having mechanical fuel nebulizers.

A carburetor having a mechanical fuel nebulizer is disclosed in the patent to C. P. Tolman, No. 2,105,992. This patent discloses a structure wherein fuel is mechanically nebulized, mixed with a quantity of air, and the nebulized fuel and air mixture is in turn mixed with a second quantity of air. In Tolman, the valve for controlling the ratio between the nebulized fuel and air mixture and the second quantity of air is fixed, whereas according to the present invention, which is an improvement over the Tolman structure, the valve for controlling the ratio is variable, being automatically controlled. The original mixing of nebulized fuel and air takes place in a main air conduit from which excess fuel is condensed. The nebulizing of the fuel cools the main air conduit providing a condensing chamber. The result is a cold fuel mixture to the engine, which fact, together with the high degree of atomization, results in a high fuel economy. Prior art carburetors of the conventional type have been unsatisfactory for the reason that they fail to provide a sufficiently rich fuel and air mixture under extreme load conditions. The carburetor according to the present invention provides the correct ratio of fuel to air under all operating conditions. As the result of this fact and as a result of the operation resulting from my new construction, automobile engines equipped with carburetors according to my invention develop greater power and deliver more miles per gallon of fuel than has been possible previously.

An object of the invention is to provide a carburetor in which the ratio of fuel to air is correct for all operative conditions, and particularly under extreme load conditions.

Another object of the invention is to provide a carburetor in which the proportioning of atmospheric air with nebulized fuel is under the control of the throttle actuating means and of the flow and pressure conditions within the carburetor.

Another object of the invention is to provide a carburetor having a mechanical nebulizer for nebulizing fuel, which is associated with mechanism for proportioning the nebulized fuel and air according to the action of the throttle, the suction in the mixing chamber and the suction in the intake manifold.

A further object of the invention is to provide a mechanism for proportioning nebulized fuel with air according to the operation of the throttle, the suction in the mixing chamber and the suction in the intake manifold when same is at low values.

A still further object of the invention is to provide a carburetor having structure for directing a mixture of nebulized fuel and air through tubes to a mixing chamber, and controlling the flow of nebulized fuel and air through at least one of said tubes in addition to the flow of a supplementary supply of air by the action of the throttle actuating means, the suction in the mixing chamber and the suction in the intake manifold.

Figure 2:
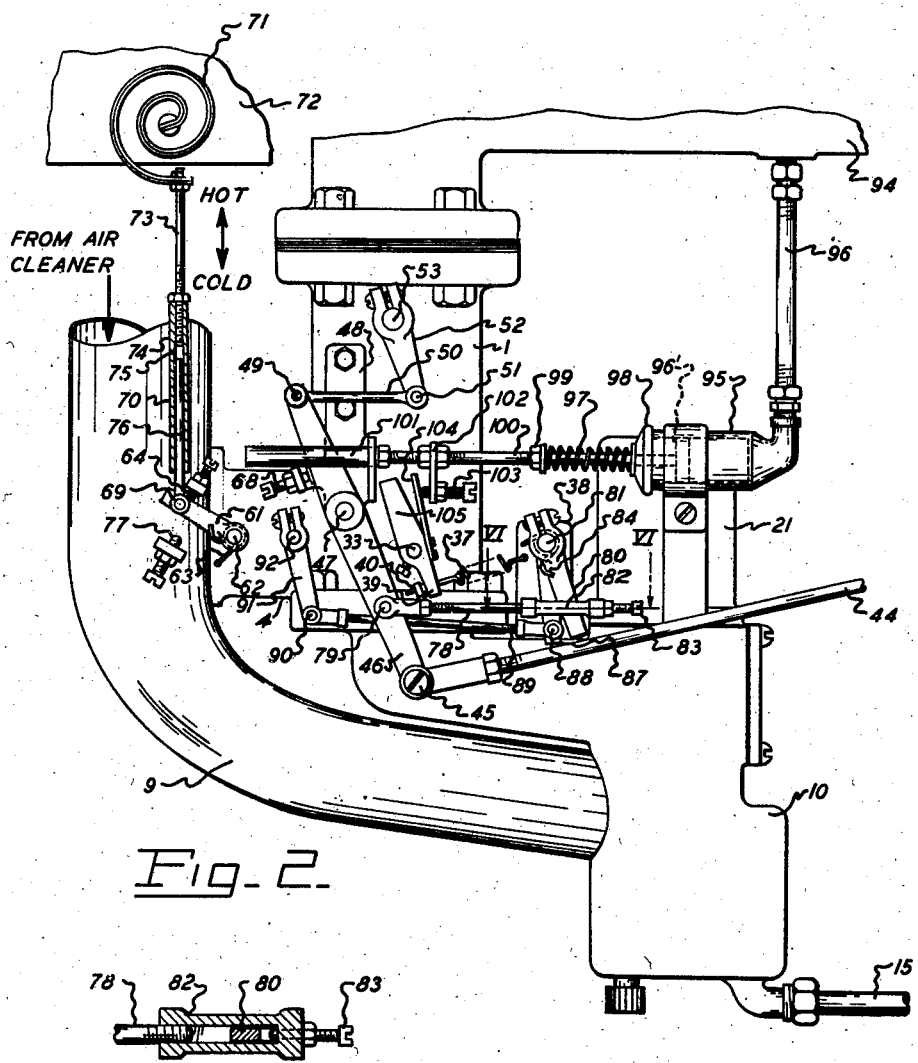
Figure 6:
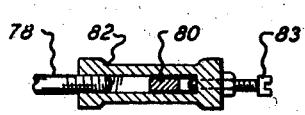

These and other objects residing in the arrangement, combination and construction of the parts will be apparent from the following specification when taken with the accompanying drawings, in which Fig. 1 is a vertical section disclosing a carburetor according to the present invention, with the parts in the position taken when the engine to which it is connected is not running, Fig. 2 is an elevation, partly in section, disclosing the structure shown in section in Fig. 1, Fig. 3 is a perspective view of a detail disclosing the throat tubes, Fig. 4 is a horizontal section disclosing the structure of the nebulizing screen and position of the fuel nozzle, Fig. 5 is a perspective view of another detail disclosing the proportioning valve, Fig. 6 is a partial section on the line VI—VI in Fig. 2 disclosing a detail of the invention, and Fig. 7 is a transverse sectional view through the mixing chamber substantially on line 7—7 of Fig. 1.

Referring particularly to the drawings, the reference character 1 indicates a main carburetor housing having therein a mixing chamber 2 and a throttle valve 3 for controlling the flow of fuel and air mixture to the intake manifold of an internal combustion engine not shown. Communicating with the mixing chamber 2 is a supplementary air conduit 4 and a main air conduit 5. The main air conduit 5 at the entrance to the mixing chamber 2 is restricted into throat tubes 6 and 7, as shown particularly in Figs. 1 and 3. For convenience the throat tubes 6 and 7 extend from a plate 8 which is bolted between the housing 1 and the main air conduit 5. Both the supplementary air conduit 4 and the main air conduit 5 receive their air through an air inlet 9 through which air is drawn from the atmosphere through a suitable air cleaner not shown. The communication between the air inlet 9 and the main air conduit 5 is through a nebulizer housing 10.

The nebulizer housing 10 has at the lower side thereof a sump 14 into which gasoline flows from a supply tube 15 having communication with a suitable storage tank, not shown. Preferably a conventional fuel pump is disposed in the supply tube 15 between the sump 14 and the storage tank. The gasoline in the sump 14 is maintained at a level 16 by a valve 17 under the control of a float 18. The structure employed for maintaining the gasoline at the level 16 in the sump 14 may be that disclosed or any other suitable structure. For convenience, a drain 13 from the sump is provided.

Disposed in the sump 14 is a gear pump 19 driven by a shaft 20 connected to an electric motor 21. The gear pump 19 pumps gasoline from the sump 14 through a nozzle 22. The nozzle 22 is disposed adjacent the shaft 20 and directs a stream of liquid gasoline under high pressure into a screen 23, also driven by the shaft 20 of the motor 21. The screen 23 is provided with a top cover 24 to prevent gasoline from the nozzle 22 from escaping from the top of the screen 23. Also the screen 23 is provided with baffles 25 extending radially from the shaft 20 and constructed of screen material. The baffles 25 are for the purpose of breaking up the stream of gasoline from the nozzle 22. It is preferred that the mesh of the screen comprising the cylinder 23 be 100 and that of the baffles 25 be 80. The motor 21 rotates at a high rate of speed which may be, for instance, between 1700 and 1800 revolutions per minute, with the result that the centrifugal force, as well as the impact of the screen 23 and the baffles 25 against the particles of gasoline, nebulize the liquid gasoline.

When the engine is turning over, air is drawn through the inlet 9, the nebulizer housing 10 and the screen 23, into the main air conduit 5. As the air passes through the housing 10 and screen 23, it picks up nebulized fuel. Disposed in the main air conduit 5, preferably spaced about three quarters of an inch from the screen 23, is a screen 30 extending across the main air conduit 5 and extending upwardly about one-half of the distance to the top thereof. The screen 30 is about the same mesh as the screen baffles 25, namely 80, and is for the purpose of preventing the passage of foreign matter and liquid drops of fuel therepast. Since drops of liquid do not fly from the upper portion of the screen 23, the screen 30 need not extend higher than shown. The bottom of the main air conduit 5 is inclined downwardly toward the nebulizer housing 10 so that excess fuel not carried through to the mixing chamber 2 by the air stream will flow back into the sump 14. To prevent hindrance to this flow, the screen 30 is spaced from the side and bottom walls of the conduit 5. It will be understood that due to the nebulizing of the liquid fuel the temperature of the main air conduit 5 is substantially reduced. In actual practice, the temperature is reduced to the point where the outside of the main air conduit 5 feels extremely cold to the touch. This fact converts the main conduit 5 into a condensing chamber and apparently has a bearing on the feature of the operation which results in the quantity of nebulized fuel picked up by the air stream through the main air conduit 5, varying with the amount of air passing through the main air conduit 5.

When the engine to which the carburetor is connected is stopped, the entrance to the mixing chamber 2 is closed by a partition 31 and a proportioning valve 32. The proportioning valve 32 is pivoted about the axis of a pin 33 to which it is secured by a set screw 34. The outer end of the proportion valve 32 has an extension or lug 35' thereon serving as a stop to hold the valve 32 away from the wall of the mixing chamber, even when valve 32 is in its extreme of movement toward the closed position, as illustrated in Fig. 1, thereby providing a substantially crescent-shaped leakage passage 35 which is open at all times and under all conditions.

The proportioning valve 32 is retained in the position shown in Fig. 1 by a spring 37 shown in Fig. 2 connected at one end to a bracket 38 and at the other end to an arm 39 secured to the shaft 33, to which the proportioning valve 32 is secured. Thus, as viewed in Fig. 2, the spring 37 tends to rotate the shaft 33 in a counterclockwise direction, thereby urging the stop 35' of the proportioning valve 32 against the wall of the mixing chamber 2. The end of the spring 37 connected to the arm 39 is threaded and passes through an opening in the arm 39. On the opposite side of the arm 39 from the spring 37 there is provided a nut 40 for adjusting the tension in the spring 37. The tension of the spring 37 should be adjusted so that the proportioning valve 32 is just held closed when the engine is stopped, but is opened a very little as soon as the engine starts, and as the engine increases in speed is opened proportionately. It will be understood that the opening of the valve 32 will depend upon the suction in the mixing chamber 2 and on the position of the valves hereinafter described, in the supplementary air passage 4.

The throat tube 6 extends through the partition 31 to provide an uninterrupted communication passage between the main air conduit 5 and the mixing chamber 2. The throat tube 7 is provided with a flared or fanned-out outlet end 41 which is arranged adjacent the side wall of the chamber 2, against which the stop 35' of the proportioning valve 32 bears when in closed position. Thus, as will particularly appear from Figs. 1 and 7, the flared end 41 is contiguous with and directly below the leakage passage 35 when the proportioning valve 32 is in closed position.

There are arranged in the supplementary air conduit 4 valves 42 and 43, both of which are controlled by the throttle actuating or control rod 44 which is operatively connected to the throttle valve 3. The throttle actuating or control rod 44 extends in a conventional manner to some convenient location within the body of the vehicle as to a hand throttle lever or to an accelerator pedal, for manual operation by the operator of the vehicle, and, as shown, consists of a rod. The throttle rod 44 is pivoted by a pin 45 to one end of a lever 46 which is in turn pivoted between its ends about a pin 47 carried by a bracket 48 secured to the housing 1. There is pivoted to the opposite end of the lever 46 about a pin 49, a link 50, which is in turn pivoted by a pin 51 to one end of a lever 52. The lever 52 is fixedly secured to a rod 53 which is journaled into the housing 1 and carries the throttle valve 3. Thus, movement of the throttle rod 44 to swing the lever 46 about its pin 47 results in rotative movement of the rod 53 and thus operation of the throttle valve 3.

An automatic choke may be provided employing the air valve 42 to attain an automatic choking effect when the engine is cold. The valve 42 is mounted on a rod 62, which has thereon and extending laterally an arm 61. A spring 63 normally urges rotation of the rod 62 in a clockwise direction to bring the arm 61 against the adjustable stop 64. Limit of movement of the arm 61 in a counter-clockwise direction is determined by an adjustable stop 77 against which the arm 61 abuts.

The arm 61 has one end of a lost motion link 70 pivoted thereto by a pin 69. The opposite end of the lost motion link 70 is connected to a spiral bi-metallic element 71 mounted on the outside of the exhaust manifold 72. This bi-metallic element is arranged so that when the engine is cold the link 70 is urged downwardly to swing arm 61 in a counter-clockwise direction and thus move the air valve 42 to a position of maximum restriction of the passage through supplementary air conduit 4. The position of maximum restriction of valve 42 under the action of the bi-metallic element 71 is determined and adjusted by the position of the adjustable stop 77 in the path of movement of the arm 61. In use, when the exhaust manifold heats up, the spring 63 swings the arm 61 due to the fact that the force of the bi-metallic element is changed. Specifically, the lost motion link 70 consists of a threaded rod 73 having a threaded connection with the sleeve 74. The sleeve 74 is provided with a bore 75 in which rod 76 lies, this rod being slidable in and out of the bore 75.

The air valve 43 in the supplementary air conduit 4 is actuated by connection from the throttle rod 44. This connection consists of a link 78 pivoted at one end by a pin 79 to the lever 46. The opposite end of the link 78 is provided with an adjustable connection with an arm 80 connected to and pivoted about the axis of a pin 81 journaled in the bracket 38. The adjustable connection, best shown in Fig. 6, consists of a loop 82 through which the arm 80 extends. The loop is provided at the outer end thereof with an adjusting screw 83 against which the inner end of which the arm 80 bears. Thus by adjusting the screw 83 in and out, the angular position of the arm 80 with respect to the angular position of the arm 46 may be adjusted. A spring 84 is provided for continuously urging the arm 80 in a counter-clockwise direction against the screw 83.

Also secured to the pin 81 is an arm 87 which has pivotally connected thereto by a pin 88 one end of a link 89, the other end of which is pivoted by a pin 90 to an arm 91. The arm 91 is secured to a rod 92 which is journaled in the portion of the housing 1 comprising the supplementary air conduit 4, and extends therethrough. The portion of the rod 92 within the supplementary air conduit 4 has the air valve 43 secured thereto, so that as the rod 92 is rocked under the action of the arm 91 from the throttle rod 44, the air valve 43 is operated. It will be understood that the adjusting of the position of the arm 80 with respect to the arm 46 by the adjusting screw 83 adjusts the position of the valve 43 in the supplementary air conduit 4, with respect to the position of the throttle valve 3.

The proportioning valve 32 is under the control of the suction in the intake manifold 94 while the suction therein is at predetermined low values. For providing this control a cylinder 95 has one end thereof connected by a tube 96 to the intake manifold 94. Within the cylinder 95 is a piston 96' which is normally urged to its left position as viewed in Fig. 2 by a spring 97 bearing against the end 98 of the cylinder 95 and a collar 99 on the piston rod 100. The outer end of the piston rod is slidable in a support 101 carried by the bracket 48. Thus, when there is a high degree of suction in the intake manifold 94, the piston 96' is drawn to the right as viewed in Fig. 2, compressing the spring 97, but when the suction falls to a low degree the spring 97 moves the piston 96' toward the left as viewed in Fig. 2.

Carried by the piston rod 100 is an abutment 102 having thereon an adjustable stop 103. The stop 103 is arranged to bear against a cantilevered leaf spring 104 secured to an arm 105 which is in turn secured to the rod 33 on which the proportioning valve 32 is supported for rocking movement. When the engine is operating under such conditions as to provide a high degree of suction in the intake manifold 94, the stop 103 will be moved to the right a distance sufficient to prevent any contact with the cantilevered leaf spring 104, and thus in this position will not interfere with the operation of the valve 32. However, when the suction in the intake manifold comes to a predetermined low value, the stop 103 will move against the spring 104 to rotate the arm 105 and with it the rod 33 in a counterclockwise direction to move the proportioning valve 32 toward closed position.

The operation of the invention is as follows: The electric motor 21 is connected in circuit with the ignition circuit of the engine with which the carburetor is associated, so that the closing of the ignition switch closes the motor 21 circuit to operate the same. The rotation of the motor 21 drives the gear pump 19, which forces liquid fuel from the sump 14 up through the nozzle 22 into the nebulizing screen 23. The rotating screen 23, together with its baffles 25, breaks the liquid fuel up into finely divided particles. As the engine starts to turn over it draws air through the air inlet 9 and past the nebulizing screen 23 to carry finely divided fuel into the main air conduit 5. At idling speeds, before the actuation of the throttle rod 44, the throttle valve 3 and the air valve 43 will be in the positions as shown in Fig. 1. In these positions the suction in the intake manifold is enabled to draw a slight amount of air past the valve 43 and enough mixture of air and fuel from the mixing chamber 2 past the throttle valve 3 to maintain the idling operation of the engine. Since a relatively small amount of air is passing through the main air conduit 5, a relatively small amount of fuel will be picked up by the air passing through the main air conduit 5, with the result that the balance of the fuel will be condensed on the walls of the main air conduit 5 and will drain back into the sump 14.

The tension of the spring 37 holding the proportioning valve 32 closed is adjusted so that as soon as the engine starts to turn over the proportioning valve 32 opens slightly. It has been found that with this slight opening at very low engine speeds, together with the flared end 41 of the throat tube 7 and the leakage passage 35 in the proportioning valve 32, a smooth operation of the engine is provided. As the throttle valve 9 is opened the air valve 43 in the supplementary air conduit 4 is opened, permitting the passage of more air through the supplementary air conduit 4. It will be understood that as the throttle valve 3 is opened and the air valve 43 is opened, the proportioning valve 32 will open against the action of the spring 37 so long as a predetermined degree of suction is maintained in the intake manifold.

At a throttle valve 3 position which is just before its full open position, the air valve 42 begins to move toward its maximum restricting position, and at full open throttle valve 3 the air valve 42 is at its maximum restricting position, which is not, however, fully closed as previously explained. The maximum openings of the throttle valve 3 and of the air valve 43 are determined by the position of the adjustable stop 68.

During normal operation when there is a sufficient degree of suction in the intake manifold 94, the proportioning valve 32 moves freely, restricted only by the tension of the spring 37. It will be understood that the movement of the valve 32 depends upon the flow of air through the supplementary air conduit 4, which in turn depends upon the suction in the mixing chamber 2, and the suction in the mixing chamber 2 depends on the suction in the intake manifold 94 as well as on the position of the throttle valve 3 and of the air valves 42 and 43 in the supplementary air conduit 4 and on the speed of the engine. When the degree of suction in the intake manifold 94 drops to a predetermined value, the spring 97 urges the stop 103 to the left as viewed in Fig. 2 to move it against the spring 104 to swing the arm 105 about the axis of the rod 33 to move the proportioning valve 32 toward closed position. As the proportioning valve 32 closes it will reduce the flow of air through the supplementary air conduit 4, thereby increasing the suction at the throat tubes 6 and 7. It will be understood that even when the proportioning valve 32 is moved toward the closed position to bring stop 35' against the wall of mixing chamber 2, as it will be for predetermined low values of suction, the leakage passage 35 will function to permit the drawing of fuel and air through the throat tube 7 the passage 35 being substantially crescent-shaped and the flared or fanned-out end 41 of the tube 7 being disposed in and substantially following the shape of the passage, thereby increasing the suction of nebulized fuel through the tube 7.

One of the principal difficulties with conventional carburetors is that when an excessive load is placed on the engine and the throttle valve is opened to provide additional fuel, the suction drops to such a low value as to prevent the feeding of a sufficiently rich mixture to the engine to provide for its continued operation at the desired speed and efficiency. According to the present invention, when the suction drops due to increased load and/or to opening the throttle valve 3, the closing or partial closing of the proportioning valve 32 will increase the suction at the throat tubes 6 and 7, thereby drawing more air through the main air conduit 5 causing it to pick up additional fuel and to furnish the engine with a substantially richer mixture than would be provided otherwise. The net result is that with a carburetor according to the present invention, and with an excessive load on the engine such as when the vehicle is being driven up a hill, the fuel and air mixture to the engine is sufficiently rich to overcome any tendency of the engine to decrease its speed and under some conditions eventually stall. Furthermore, the carburetor according to the present invention has particular advantage at high speed, when the engine suction drops to such a degree in the intake manifold that the suction in a conventional carburetor would not be sufficient to provide a sufficiently rich mixture to the engine. Under such conditions with the present carburetor, the proportioning valve 32 is closed or moved toward closed position as the circumstances require to provide a fuel and air mixture to the engine of the desired richness.

The invention has been described as relating to a carburetor for proportioning nebulized liquid fuel and air. It will be understood, however, that the invention is equally applicable to the proportioning of a gaseous fuel and air. Accordingly, it is desired that the claims be interpreted so that the means for nebulizing describe either nebulizing apparatus such as disclosed or its equivalent structure for supplying gaseous fuel.

Having thus described my invention, what I desire to secure by Letters Patent and claim is:

1. A carburetor comprising a housing structure having therein a mixing chamber and an air inlet passage with a supplementary air conduit and a main air conduit establishing communication from said air inlet passage to the mixing chamber, means supplying nebulized fuel to air passing through said main air conduit, a throat tube establishing communication between said main air conduit and said mixing chamber, a second throat tube extending from said main air conduit and having an outlet opening within the mixing chamber adjacent to the opening of said supplementary air conduit thereinto, and a proportioning valve swingably mounted within the mixing chamber normally partially closing over the communicating end of the supplementary air conduit and the outlet end of the second throat tube and movable under suction.

2. A carburetor comprising a housing structure having therein a mixing chamber and an air inlet passage with a supplementary air conduit and a main air conduit establishing communication from said air inlet passage to the mixing chamber, means supplying nebulized fuel to air passing through said main air conduit, a throat tube establishing communication between said main air conduit and said mixing chamber, a second throat tube extending from said main air conduit and having an outlet opening within the mixing chamber adjacent to the opening of said supplementary air conduit thereunto; a proportioning valve swingably mounted within the mixing chamber over the communicating end of the supplementary air conduit and the outlet end of the second throat tube, a stop holding said proportioning valve partly open, and spring means normally resiliently urging the proportioning valve toward closed position and permitting opening of said valve under suction in the mixing chamber.

3. A carburetor comprising a housing structure having therein a mixing chamber, an air inlet passage, a main air conduit establishing communication from said air inlet passage to the lower part of the mixing chamber, a supplementary air conduit leading from the air inlet passage and opening into the mixing chamber above the connection therewith of the main air conduit, means supplying nebulized fuel to air passing from the air inlet passage to said main air conduit, a plate interposed between the main air conduit and the mixing chamber provided with a throat tube establishing communication between said main air conduit and said mixing chamber and having a second throat tube extending angularly upwardly and provided with a flared outlet end terminating adjacent and substantially conforming to the wall of the mixing chamber beyond the opening of the supplementary air conduit thereinto, a proportioning valve swingably mounted within the mixing chamber and normally urged to a position of closing over the flared outlet end of the second throat tube and the communicating end of the supplementary air conduit, and a stop holding said proportioning valve from complete closing against the wall of the mixing chamber whereby a substantially crescent-shaped leakage passage is provided, said proportioning valve being movable under suction forces within the mixing chamber to swingably open and increase the size of the crescent-shaped passage.

4. A carburetor comprising a housing structure having therein a mixing chamber and an air inlet passage with a supplementary air conduit and a main air conduit establishing communication from said air inlet passage to the mixing chamber, means supplying nebulized fuel to air passing through said main air conduit, a throat tube establishing communication between said main air conduit and said mixing chamber, a second throat tube extending from said main air conduit and having an outlet opening within the mixing chamber adjacent to the opening of said supplementary air conduit thereinto, a proportioning valve swingably mounted within the mixing chamber normally partially closing over the communicating end of the supplementary air conduit and the outlet end of the second throat tube and movable under suction, a throttle valve at the outlet of said mixing chamber, an air control valve in said supplementary air conduit, and means within the control of an operator for simultaneously adjusting said throttle valve and said air valve.

5. A carburetor comprising a housing structure having therein a mixing chamber and an air inlet passage with a supplementary air conduit and a main air conduit establishing communication from said air inlet passage to the mixing chamber, means supplying nebulized fuel to air passing through said main air conduit, a throat tube establishing communication between said main air conduit and said mixing chamber, a second throat tube extending from said main air conduit and having an outlet opening within the mixing chamber adjacent to the opening of said supplementary air conduit thereinto, a proportioning valve swingably mounted within the mixing chamber normally partially closing over the communicating end of the supplementary air conduit and the outlet end of the second throat tube and movable under suction, a throttle valve at the outlet of said mixing chamber, an air valve in said supplementary air conduit, throttle control means for adjusting said throttle valve, and lost motion actuating means operated by said throttle control for actuating said air valve.

6. A carburetor comprising a housing structure having therein a mixing chamber and an air inlet passage with a supplementary air conduit and a main air conduit establishing communication from said air inlet passage to the mixing chamber, means supplying nebulized fuel to air passing through said main air conduit, a throat tube establishing communication between said main air conduit and said mixing chamber, a second throat tube extending from said main air conduit and having an outlet opening within the mixing chamber adjacent to the opening of said supplementary air conduit thereinto, a proportioning valve swingably mounted within the mixing chamber normally partially closing over the communicating end of the supplementary air conduit and the outlet end of the second throat tube and movable under suction, an intake manifold connection at the outlet end of said mixing chamber, spring urged means normally resisting swinging movement of said proportioning valve under suction toward the open position, and intake suction actuated means relieving said spring urged means.

7. A carburetor comprising a casing member having an elongated updraft mixing chamber therein, said casing member having a partition extending partly thereacross near the lower intake end and being provided with a lateral supplementary air conduit opening thereinto also near the lower end, a nebulizer housing having a liquid fuel sump in its lower part, an air inlet passage having connection with the inflow end of said supplementary air conduit and being connected with said nebulizer housing above the liquid level therein, a main air conduit leading from said nebulizer housing to the lower intake end of the mixing chamber, a rotary nebulizer in said nebulizer housing adjacent to the connection of the main air conduit therewith, means for supplying a stream of liquid fuel from said sump to said rotary nebulizer, a plate interposed at the intake end of said mixing chamber, a throat tube extending upwardly from said plate and opening through the partition of the mixing chamber housing thereby establishing direct communication from the main air conduit to the mixing chamber, a second throat tube extending upwardly and angularly from said plate having a flared outlet end disposed adjacent and substantially conforming to the wall of the mixing chamber above the opening of the supplementary air conduit thereinto, a proportioning valve swingably mounted at the edge of the partition over the communicating end of the supplementary air conduit and the outlet of said second throat tube, a stop holding said proportioning valve partly open whereby a substantially crescent-shaped passage is provided from the communicating end of the supplementary air conduit to the mixing chamber around the flared end of said second throat tube, and spring means normally resiliently urging the proportioning valve toward closed position and permitting opening of said valve under suction in the mixing chamber whereby the crescent-shaped opening is enlarged.

8. A carburetor comprising a casing member having an elongated updraft mixing chamber therein, said casing member having a partition extending partly thereacross near the lower intake end and being provided with a lateral supplementary air conduit opening thereinto also near the lower end, a nebulizer housing having a liquid fuel sump in its lower part, an air inlet passage having connection with the inflow end of said supplementary air conduit and being connected with said nebulizer housing above the liquid level therein, a main air conduit leading from said nebulizer housing to the lower intake end of the mixing chamber, a rotary nebulizer in said nebulizer housing adjacent to the connection of the main air conduit therewith, means for supplying a stream of liquid fuel from said sump to said rotary nebulizer, a plate interposed at the intake end of said mixing chamber, a throat tube extending upwardly from said plate and opening through the partition of the mixing chamber housing thereby establishing direct communication from the main air conduit to the mixing chamber, a second throat tube extending upwardly and angularly from said plate having a flared outlet end disposed adjacent and substantially conforming to the wall of the mixing chamber above the opening of the supplementary air conduit thereinto, a proportioning valve swingably mounted at the edge of the partition over the communicating end of the supplementary air conduit and the outlet of said second throat tube, a stop holding said proportioning valve partly open whereby a substantially crescent-shaped passage is provided from the communicating end of the supplementary air conduit to the mixing chamber around the flared end of said second throat tube, spring means normally resiliently urging the proportioning valve toward closed position and permitting opening of said valve under suction in the mixing chamber whereby the crescent-shaped opening is enlarged, a throttle valve at the outlet end of said mixing chamber, an air control valve in the supplementary air conduit, throttle control means for adjusting said throttle valve, and a lost motion actuating means from said throttle means to said air valve.

9. A carburetor comprising a casing member having an elongated updraft mixing chamber therein, said casing member having a partition extending partly thereacross near the lower intake end and being provided with a lateral supplementary air conduit opening thereinto also near the lower end, a nebulizer housing having a liquid fuel sump in its lower part, an air inlet passage having connection with the inflow end of said supplementary air conduit and being connected with said nebulizer housing above the liquid level therein, a main air conduit leading from said nebulizer housing to the lower intake end of the mixing chamber, a rotary nebulizer in said nebulizer housing adjacent to the connection of the main air conduit therewith, means for supplying a stream of liquid fuel from said sump to said rotary nebulizer, a plate interposed at the intake end of said mixing chamber, a throat tube extending upwardly from said plate and opening through the partition of the mixing chamber housing thereby establishing direct communication from the main air conduit to the mixing chamber, a second throat tube extending upwardly and angularly from said plate having a flared outlet end disposed adjacent and substantially conforming to the wall of the mixing chamber above the opening of the supplementary air conduit thereinto, a proportioning valve swingably mounted at the edge of the partition over the communicating end of the supplementary air conduit and the outlet of said second throat tube, a stop holding said proportioning valve partly open whereby a substantially crescent-shaped passage is provided from the communicating end of the supplementary air conduit to the mixing chamber around the flared end of said second throat tube, spring means normally resiliently urging the proportioning valve toward closed position and permitting opening of said valve under suction in the mixing chamber whereby the crescent-shaped opening is enlarged, an intake manifold connection from the outlet end of said mixing valve, spring urged means normally resisting swinging movement of said proportioning valve toward open position, and intake suction actuated means relieving said spring urged means.

10. A carburetor comprising a housing structure having therein a mixing chamber provided with an outlet connected with an engine manifold and the like, said housing structure having a supplementary air inlet passage leading laterally into the mixing chamber at a point spaced from the outlet, a main air conduit leading to the mixing chamber at a point spaced away from the outlet thereof beyond the opening of the supplementary air conduit into said chamber, means supplying vaporized liquid fuel to air passing through said main air conduit, a restricted passage opening from said main air conduit into said mixing chamber, a second restricted passage opening from said main air conduit into the mixing chamber and having an outlet adjacent to the opening of said supplementary air conduit into said mixing chamber, and a proportioning valve swingably mounted within the mixing chamber intermediate said passages and normally partially closing over the communicating end of the supplementary air conduit and the outlet end of the second passage and movable toward an open position under suction.

11. A carburetor as defined in claim 10 having spring means normally resiliently opposing opening movement of said proportioning valve.

12. A carburetor as defined in claim 10 having movable spring means normally resiliently resisting swinging of said proportioning valve toward the open position, and intake suction operated means relieving said spring means.

13. In a device of the character described for delivering a fuel and air mixture to the intake manifold of an internal combustion engine having a throttle and a control therefor, a mixing chamber for connection to the intake manifold of the engine, means under the control of the throttle to regulate the rate of flow of the mixture from the mixing chamber to the intake manifold, main and supplementary air conduits communicating with said mixing chamber, a source of nebulized fuel arranged to furnish nebulized fuel to said mixing chamber through said main air conduit in accordance with the rate of flow of air therethrough, means in said supplementary air conduit for regulating the opening therethrough, means co-ordinating the movement of said regulating means with the movement of said throttle control, a proportioning valve arranged to regulate the relative proportions of air drawn through said main and supplementary air conduits, controllable by the flow of supplemental air, and means controllable by the suction in the intake manifold only at low values thereof for regulating the position of said proportioning valve.

14. A carburetor for delivering a mixture of fuel and air to the intake manifold of an internal combustion engine comprising a mixing chamber, a throttle valve under the control of a throttle control means for controlling the flow of fuel and air from said mixing chamber to said intake manifold, a main air conduit communicating with said mixing chamber, a supplementary air conduit communicating with said mixing chamber, means to furnish nebulized fuel to said mixing chamber through said main air conduit in amounts proportional to the rate of flow of air therethrough, valve means under the control of said throttle control means for controlling the rate of flow of air through said supplementary air conduit, valve means for increasing the flow of air and thus fuel from the main air conduit to the mixing chamber upon decrease in intake manifold suction due to increase in the load on the engine, and valve control means responsive to a predetermined degree of reduced suction in the intake manifold for actuating said valve means.

HEBER R. MASON.